(12) United States Patent
Matsumoto et al.

(10) Patent No.: US 12,542,857 B2
(45) Date of Patent: Feb. 3, 2026

(54) BINDING PROCESSING DEVICE, IMAGE FORMING SYSTEM, BINDING PROCESSING METHOD, AND NON-TRANSITORY COMPUTER-READABLE RECORDING MEDIUM RECORDING PROGRAM

(71) Applicant: FUJIFILM Business Innovation Corp., Tokyo (JP)

(72) Inventors: Masashi Matsumoto, Kanagawa (JP); Nobuhide Inaba, Kanagawa (JP); Takashi Ogino, Kanagawa (JP); Mitsuhiro Nakamura, Kanagawa (JP); Taichi Fuchu, Kanagawa (JP); Takumi Uegane, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 102 days.

(21) Appl. No.: 18/177,131

(22) Filed: Mar. 2, 2023

(65) Prior Publication Data
US 2023/0319202 A1 Oct. 5, 2023

(30) Foreign Application Priority Data
Mar. 29, 2022 (JP) ................. 2022-052872

(51) Int. Cl.
*B31F 1/36* (2006.01)
*B65H 37/04* (2006.01)
(Continued)

(52) U.S. Cl.
CPC ......... *H04N 1/00639* (2013.01); *B65H 37/04* (2013.01); *H04N 1/00082* (2013.01);
(Continued)

(58) Field of Classification Search
CPC .......... B65H 37/04; B65H 2301/43828; B65H 2301/51616; B65H 2301/5142;
(Continued)

(56) References Cited

U.S. PATENT DOCUMENTS 2,856,323 A * 10/1958 Gordon ..................... E04C 2/32
156/220
3,717,532 A * 2/1973 Kamp ....................... B31F 1/07
428/359
(Continued)

FOREIGN PATENT DOCUMENTS

JP  2011025640  2/2011
JP  2013249573  12/2013
(Continued)

OTHER PUBLICATIONS

Espacenet machine translation of JP2016175742A; https://translationalportal.epo.org/emtp/translate/?ACTION=description-retrieval&COUNTRY=JP&ENGINE=google&FORMAT=docdb&KIND=A&LOCALE=en_EP&NUMBER=2016175742&OPS=ops.epo.org/3.2&SRCLANG=ja&TRGLANG=en (Year: 2016).*
(Continued)

*Primary Examiner* — Leslie A Nicholson, III
(74) *Attorney, Agent, or Firm* — JCIPRNET

(57) ABSTRACT

A binding processing device includes: a binding processing element that advances a binding tooth to a sheet to perform binding processing of the sheet; and a processor that performs control of drying a bound part of the sheet after the binding processing of the sheet by the binding processing element is performed.

14 Claims, 8 Drawing Sheets

(51) Int. Cl.
  *H04N 1/00* (2006.01)
  *H04N 1/032* (2006.01)

(52) U.S. Cl.
  CPC ... *H04N 1/032* (2013.01); *B65H 2301/43822* (2013.01); *B65H 2402/50* (2013.01); *B65H 2406/40* (2013.01); *B65H 2551/20* (2013.01)

(58) Field of Classification Search
  CPC ...... G03G 15/6544; G03G 2215/00852; B31F 1/07; B31F 1/36; B31F 5/02; B31F 2201/0754; B31F 2201/0784; B31F 2201/0779
  USPC ............................................ 270/58.08, 58.09
  See application file for complete search history.

(56) References Cited

U.S. PATENT DOCUMENTS

| | | | | |
|---|---|---|---|---|
| 9,399,841 | B2* | 7/2016 | Yamada | ............... D21H 27/002 |
| 10,654,240 | B2* | 5/2020 | Takahashi | ............... B65H 37/04 |
| 2014/0227064 | A1* | 8/2014 | Matsue | ................ B42C 13/003 |
| | | | | 412/37 |
| 2016/0355983 | A1 | 12/2016 | Yamada | |
| 2020/0317462 | A1* | 10/2020 | Kawakami | ................ B42B 5/00 |
| 2023/0312300 | A1* | 10/2023 | Inaba | .................... B65H 37/04 |
| | | | | 270/58.08 |

FOREIGN PATENT DOCUMENTS

| | | |
|---|---|---|
| JP | 2014024636 | 2/2014 |
| JP | 2016175742 | 10/2016 |

OTHER PUBLICATIONS

"Notice of Reasons for Refusal of Japan Counterpart Application", issued on Nov. 25, 2025, with English translation thereof, p. 1-p. 9.

* cited by examiner

FIG. 8

| MOISTURE REGULATION AMOUNT \ AMOUNT OF ADVANCEMENT | .. | .. | .. | .. | .. | .. |
|---|---|---|---|---|---|---|
| .. | ...% | ...% | ...% | ...% | ...% | ...% |
| .. | ...% | ...% | ...% | ...% | ...% | ...% |
| .. | ...% | ...% | ...% | ...% | ...% | ...% |
| .. | ...% | ...% | ...% | ...% | ...% | ...% |
| .. | ...% | ...% | ...% | ...% | ...% | ...% |
| .. | ...% | ...% | ...% | ...% | ...% | ...% |
| .. | ...% | ...% | ...% | ...% | ...% | ...% |
| .. | ...% | ...% | ...% | ...% | ...% | ...% |

BINDING PROCESSING DEVICE, IMAGE FORMING SYSTEM, BINDING PROCESSING METHOD, AND NON-TRANSITORY COMPUTER-READABLE RECORDING MEDIUM RECORDING PROGRAM

CROSS-REFERENCE TO RELATED APPLICATIONS

This application is based on and claims priority under 35 USC 119 from Japanese Patent Application No. 2022-052872 filed on Mar. 29, 2022.

BACKGROUND

(i) Technical Field

The present invention relates to a binding processing device, an image forming system, a binding processing method, and a non-transitory computer-readable recording medium recording a program.

(ii) Related Art

JP2011-25640A discloses a device including a preprocessing step of supplying and penetrating moisture to a binding margin region of each sheet of paper, and a joining step of joining the binding margin regions of the plurality of sheets of paper piled up in a booklet.

A plurality of sheets of paper can be bundled by performing binding processing for the sheets.

Here, when an amount of moisture contained in a bound part of the sheet is large, adhesion strength between the sheets decreases. For example, in a case where a user turns over a page, such a failure as release of binding might occur.

SUMMARY

Aspects of non-limiting embodiments of the present disclosure relate to a binding processing device that enhances adhesion strength between bound sheets as compared with a configuration in which a bound part of a sheet is not dried after binding processing.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a binding processing device including: a binding processing element that advances a binding tooth to a sheet to perform binding processing of the sheet; and a processor that performs control of drying a bound part of the sheet after the binding processing of the sheet by the binding processing element is performed.

BRIEF DESCRIPTION OF THE DRAWINGS

FIG. 8 is a diagram illustrating a relationship table.

DETAILED DESCRIPTION

Detailed description of an embodiment of the present invention will be made below with reference to the accompanying drawings.

Figure 1:
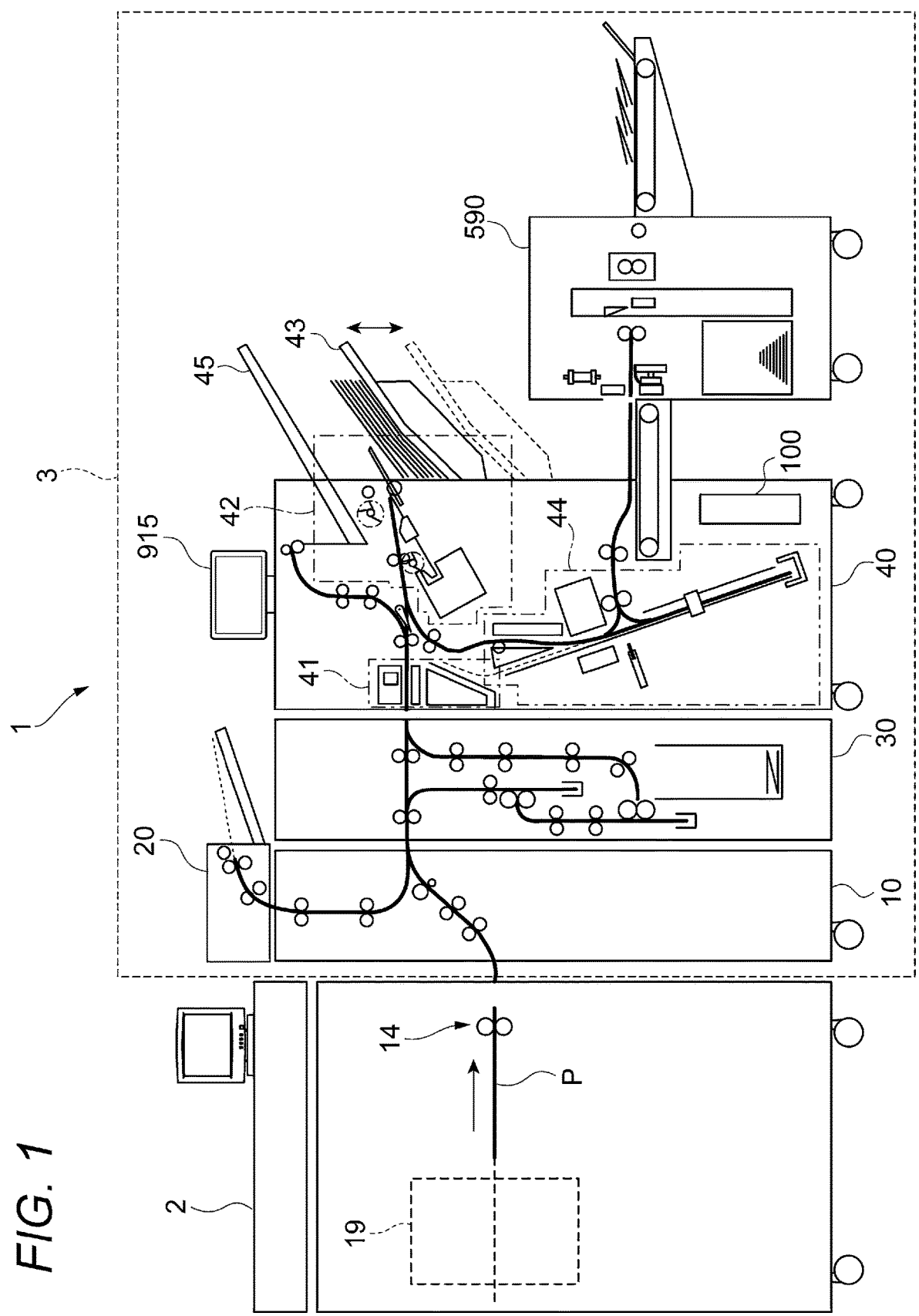
FIG. 1 is a view illustrating an entire configuration of an image forming system.

FIG. 1 is a view illustrating an overall configuration of an image forming system 1.

The image forming system 1 illustrated in FIG. 1 includes an image forming device 2 that forms an image on a sheet P, which is an example of a recording medium, and a sheet processing device 3 that performs predetermined processing on the sheet P on which an image is formed by the image forming device 2.

The image forming device 2 includes an image forming part 19 that forms an image on the sheet P by using an electrophotographic method or an inkjet method.

The image forming device 2 further includes a fixing device 14. The fixing device 14 is disposed at a downstream side of the image forming part 19 in a transport direction of the sheet P.

The fixing device 14 applies pressure and heat to the sheet P on which an image has been formed. In this manner, the image on the sheet P is fixed to the sheet P.

The sheet processing device 3, which is an example of a processing device, is provided with a transport device 10 that transports the sheet P output from the image forming device 2 to a downstream side, and a slip sheet supply device 20 that supplies a slip sheet, such as a thick sheet or a window open sheet P, to the sheet P transported by the transport device 10.

The sheet processing device 3 is provided with a folding device 30 that performs folding processing such as inner three folding (C folding) and outer three folding (Z folding) on the sheet P transported from the transport device 10.

The sheet processing device 3 is also provided with a first post-processing device 40 that is provided on a downstream side of the folding device 30 and that performs punching, end stitching, saddle stitching, and the like on the sheet P.

In other words, provided on the downstream side of the folding device 30 is the first post-processing device 40 that performs processing on a sheet bundle including a plurality of sheets P on which images have been formed by the image forming device 2, and performs processing on the sheets P sheet by sheet, and the like.

The sheet processing device 3 is further provided with a second post-processing device 590 that is disposed on a downstream side of the first post-processing device 40 and that performs processing on a bundle of center-folded or saddle-stitched sheets P.

The sheet processing device 3 is further provided with an information processing part 100, which includes a central processing unit (CPU) that executes a program, and which controls the entire sheet processing device 3.

The sheet processing device 3 is further provided with an information display unit 915 that is configured with a liquid crystal monitor or the like and that displays information to a user.

The first post-processing device 40 includes a punching unit 41 that performs punching on the sheet P and an end stitching part 42 that binds ends of a sheet bundle.

The first post-processing device is further provided with a first loading part 43 on which sheets P that have passed through the end stitching part 42 are loaded, and a second loading part 45 on which the sheets P that are not processed by the first post-processing device 40 or the sheets P that have been subjected only to punching are loaded.

The first post-processing device 40 is further provided with a saddle stitching unit 44 that center-folds or saddle stitches a sheet bundle to produce a double-page spread booklet.

Figure 2:
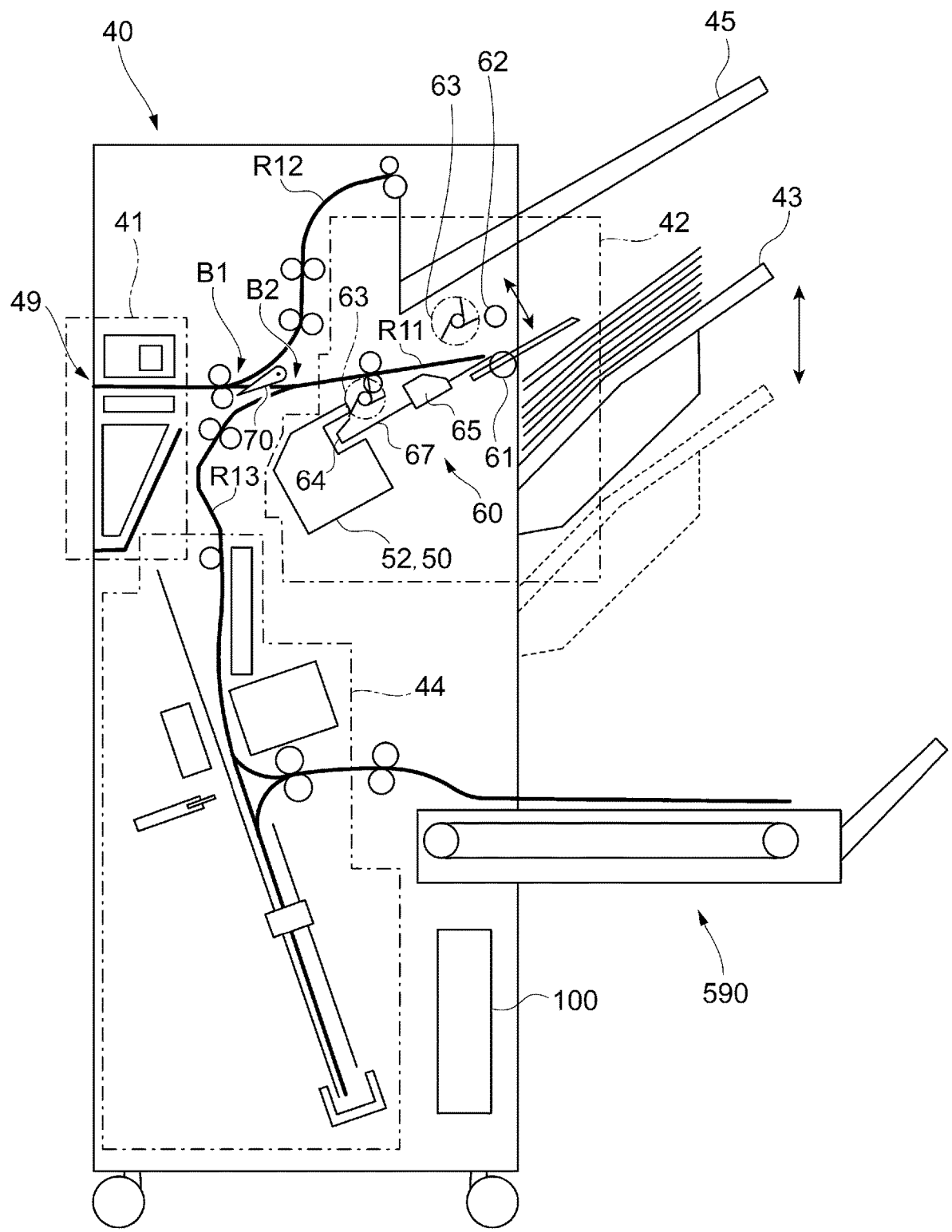
FIG. 2 is a view illustrating a configuration of a first post-processing device.

FIG. 2 is a view illustrating a configuration of the first post-processing device 40.

The first post-processing device 40 is provided with a reception port 49 that receives the sheet P transported from the folding device 30.

The punching unit 41 is provided immediately after the reception port 49. The punching unit 41 performs punching such as punching two holes or four holes on the sheet P transported to the first post-processing device 40.

A first sheet transport path R11 is provided to extend from the reception port 49 to the end stitching part 42 to transport the sheet P received by the reception port 49 to the end stitching part 42.

Further, a second sheet transport path R12 is provided to branch from the first sheet transport path R11 at a first branch part B1 and is used to transport the sheet P to the second loading part 45.

A third sheet transport path R13 is provided to branch from the first sheet transport path R11 at a second branch part B2 and is used to transport the sheet P to the saddle stitching unit 44.

A switching gate 70 is provided to switch a transport destination of the sheet P to one of the first sheet P transport path R11 to the third sheet P transport path R13.

The end stitching part 42 is provided with a sheet accumulation part 60 that accumulates a required number of sheets P to form a sheet bundle.

The sheet accumulation part 60 includes a support plate 67 that is arranged to incline with respect to a horizontal direction and supports the transported sheet P from below. In this embodiment, a sheet bundle is generated on the support plate 67.

The end stitching part 42 is further provided with a binding processing unit 50 that performs binding (end stitching) on an end of the sheet bundle generated by the sheet accumulation part 60.

In the present embodiment, as the binding processing unit 50, a binding processing unit 52 is provided that performs binding processing without using a staple.

The end stitching part 42 is further provided with a transport roller 61 that is rotationally driven to transport the sheet bundle generated by the sheet accumulation part 60 to the first loading part 43. Further provided is a movable roller 62 that is movable between a position retreated from the transport roller 61 and a position where the movable roller is pressed against the transport roller 61.

When processing is performed by the end stitching part 42, first, the transported sheet P is received at the reception port 49.

Thereafter, the sheet P is transported along the first sheet transport path R11 and reaches the end stitching part 42.

The sheet P is then transported to a position above the support plate 67 and then falls onto the support plate 67. The sheet P is supported by the support plate 67 from below, and slidingly moves on the support plate 67 due to inclination of the support plate 67 and by a rotary member 63.

Thereafter, the sheet P abuts against an end guide 64 attached to an end of the support plate 67. In other words, in the present embodiment, the end guide 64 extending upward in the drawing is provided at the end of the support plate 67, so that the sheet P that has moved on the support plate 67 abuts against the end guide 64.

Accordingly, movement of the sheet P is stopped in the present embodiment. Thereafter, this operation is performed every time the sheet P is transported from an upstream side, and a sheet bundle in which a plurality of sheets P are aligned is generated on the support plate 67.

In the present embodiment, a sheet width alignment member 65 that aligns a position of a sheet bundle in a width direction is further provided.

In the present embodiment, every time the sheet P is fed onto the support plate 67, an end portion (side portion) of the sheet P in the width direction is pressed by the sheet width alignment member 65, so that a position of the sheet P (sheet bundle) in the width direction is aligned.

When a predetermined number of sheets P are loaded on the support plate 67, binding of the end portion of the sheet bundle is executed by the binding processing unit 52, which is an example of a binding processing element.

The binding processing unit 52 executes the binding by sandwiching the sheet bundle with two binding tooth and press-fitting sheets forming the sheet bundle.

Then, in the present embodiment, the movable roller 62 advances toward the transport roller 61, and the sheet bundle is sandwiched by the movable roller 62 and the transport roller 61. Thereafter, the transport roller 61 is rotationally driven to transport the sheet bundle to the first loading part 43.

The binding processing unit 52 is provided so as to be movable toward a far side and a near side on a paper face of FIG. 2, and can perform the binding processing on the sheet P at a plurality of positions in the present embodiment.

Here, a part where the end stitching part 42 is provided can be regarded as a binding processing device that binds the sheets P.

In this embodiment, at the time of end-stitching the sheets P, sheets P on which images have been formed by the image forming device 2 are transported to the end stitching part 42. The end stitching part 42 executes the binding processing of the sheet P transported from the image forming device 2.

Figure 3:
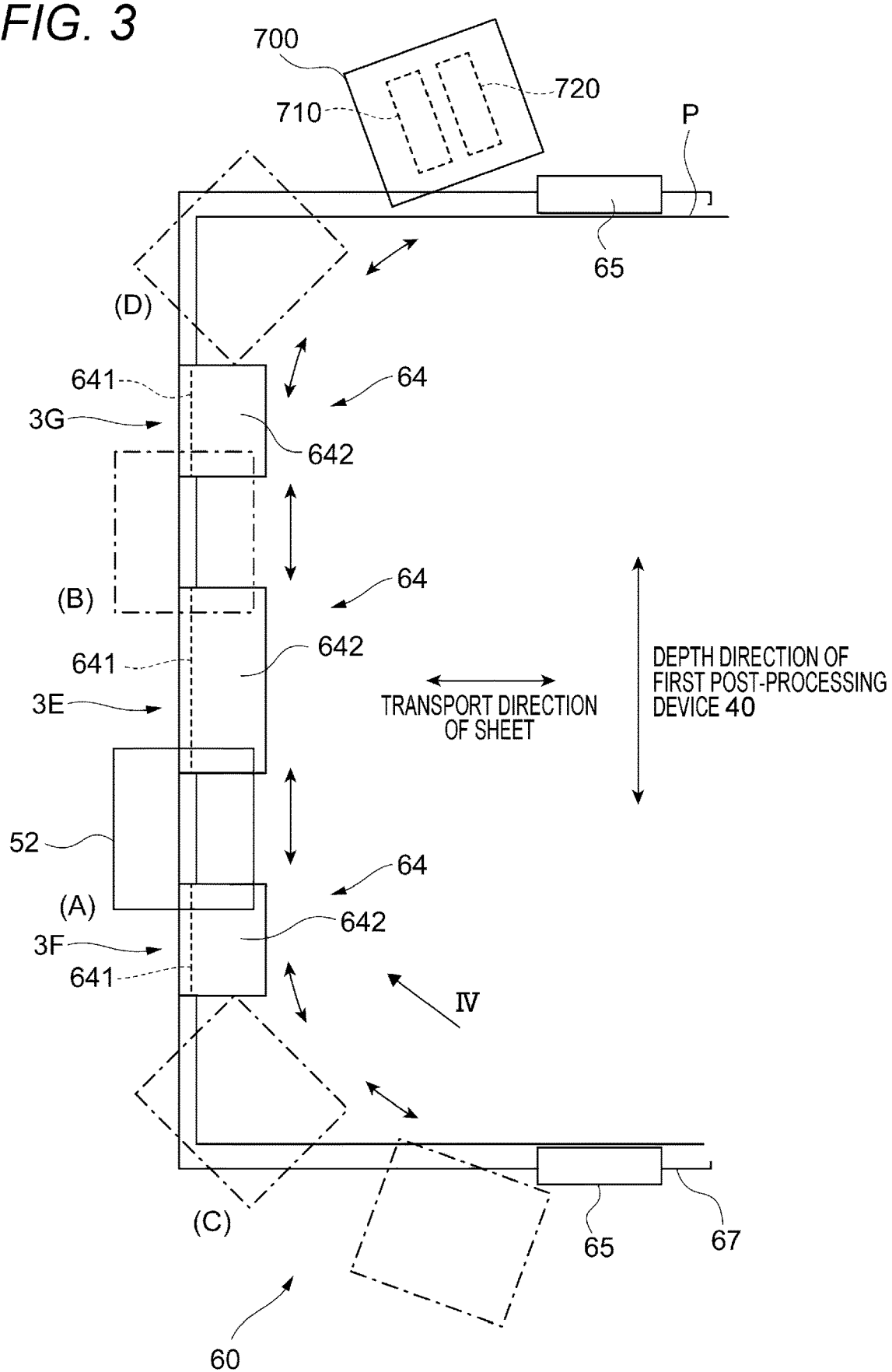
FIG. 3 is a view of a sheet accumulation part as seen from above.

More specifically with reference to FIG. 3 (the view of the sheet accumulation part 60 seen from above), in the present embodiment, the binding processing unit 52 is provided as described above.

Further, in the present embodiment, a moisture regulating mechanism 700 is provided, which is an example of a moisture regulating element that regulates moisture contained in the sheets P loaded in the sheet accumulation part 60.

In the present embodiment, every time the sheet P is transported to the end stitching part 42, moisture is regulated by the moisture regulating mechanism 700 as necessary. In other words, in the present embodiment, the moisture regulating mechanism 700 regulates the moisture on a sheet-by-sheet basis as necessary.

Alternatively, moisture may be regulated by the moisture regulating mechanism 700 after a sheet bundle is formed.

The moisture regulating mechanism 700 as an example of the moisture regulating element is provided with a moisture supply part 710 and a moisture removing part 720.

The moisture supply part 710 as an example of the moisture supply element includes, for example, an impregnation part that is impregnated with moisture such as water and moves forward or backward with respect to the sheet P, and supplies the moisture to the sheet P by bringing the impregnation part into contact with the sheet P. More specifically, the moisture supply part 710 brings the impregnation part into contact with the bound part of the sheet P to supply moisture to the bound part.

The moisture supply part 710 supplies moisture to the sheet P by, for example, spraying moisture to the sheet P from a tip of a nozzle or a head. The moisture supply part 710 supplies moisture to the sheet P by, for example, dropping water droplets from above the sheet P.

The moisture supplied to the sheet P is not limited to water, and may include components other than water.

The moisture removing part 720 has a heat source and removes moisture from a part of the sheet P to be bound. In other words, the moisture removing part 720 has a heat source and dries a bound part of the sheet P.

Specifically, for example, the moisture removing part 720 blows warm air to a bound part to dry the bound part, thereby removing moisture from the bound part.

Alternatively, for example, the moisture removing part 720 brings an object to be heated which has been heated by the heat source into contact with a bound part to remove moisture from the bound part, thereby drying the bound part.

For example, the moisture removing part 720 presses a material having a function of adsorbing moisture against the bound part to remove moisture from the bound part and dry the bound part.

When drying the bound part, instead of drying only the bound part, the entire sheet P may be dried to dry the bound part.

In addition, although in the present embodiment, the moisture supply part 710 and the moisture removing part 720 are configured to move, the moisture supply part 710 and the moisture removing part 720 may be provided in a fixed state.

In a case in which the moisture supply part 710 and the moisture removing part 720 are provided in a fixed state, the moisture supply part 710 and the moisture removing part 720 are provided at each biding position of the sheet P, for example.

Supply of moisture to the bound part and drying of the bound part are not limited to be performed by the end stitching part 42 (see FIG. 1), and may be performed in the image forming device 2.

Alternatively, the supply of moisture to the bound part and the drying of the bound part may be performed, for example, in the course of transport of the sheet P from the image forming device 2 to the end stitching part 42.

In other words, moisture may be supplied to the bound part or the bound part may be dried on the transport path of the sheet P along which the sheet P moves toward the end stitching part 42.

The binding processing unit 52 (see FIG. 3) and the moisture regulating mechanism 700 are arranged at different positions in a depth direction of the first post-processing device 40.

In the present embodiment, the binding processing unit 52 and the moisture regulating mechanism 700 move in the depth direction of the first post-processing device 40, which is a direction orthogonal to the transport direction of the sheets P (sheet bundle).

In the present embodiment, the binding processing unit 52 and the moisture regulating mechanism 700 move along one common path.

In the present embodiment, the binding processing unit 52 is movable, and can perform the binding processing at a plurality of positions of the sheet bundle.

In addition, in the present embodiment, the moisture regulating mechanism 700 is movable, and can supply and remove moisture at a plurality of positions of the sheet bundle.

The binding processing unit 52 stops, for example, at two points (a position (A) and a position (B) in FIG. 3) that are different from each other in the depth direction of the first post-processing device 40, and performs the binding processing at these two points (two point end stitching processing).

The binding processing unit 52 stops, for example, at one end of the sheet bundle (one corner of the sheet bundle) (a position (D) in FIG. 3), and performs the binding processing (one point end stitching) at this stop position.

The binding processing unit 52 stops, for example, at the other end of the sheet bundle (the other corner of the sheet bundle) (a position (C) in FIG. 3), and performs the binding processing (one point end stitching) at this stop position.

The moisture regulating mechanism 700 also stops at the two points (the position (A) and the position (B) in FIG. 3), and supplies or removes moisture at the two points.

The moisture regulating mechanism 700 stops, for example, at one end of the sheet bundle (one corner of the sheet bundle) (the position (D) in FIG. 3), and supplies or removes moisture at this stop position.

The moisture regulating mechanism 700 stops, for example, at the other end of the sheet bundle (the other corner of the sheet bundle) (the position (C) in FIG. 3), and supplies or removes moisture at this stop position.

In the present embodiment, each of the binding processing unit 52 and the moisture regulating mechanism 700 moves linearly between the position (A) and the position (B).

In the present embodiment, each of the binding processing unit 52 and the moisture regulating mechanism 700 moves between the position (A) and the position (C) and between the position (B) and the position (D) while rotating by, for example, 45°.

For moving each of the binding processing unit 52 and the moisture regulating mechanism 700, for example, a driving source such as a motor is provided therewith. In this case, each of the binding processing unit 52 and the moisture regulating mechanism 700 moves on its own.

In a case of moving each of the binding processing unit 52 and the moisture regulating mechanism 700, for example, the binding processing unit 52 and the moisture regulating mechanism 700 are attached to a movable belt or the like. Then, the belt is moved. As a result, the binding processing unit 52 and the moisture regulating mechanism 700 move.

In the present embodiment, as illustrated in FIG. 3, a plurality of the end guides 64 are provided.

Here, the plurality of end guides 64 are arranged at different positions in the depth direction of the first post-processing device 40 (the direction orthogonal to the transport direction of the sheet P).

As illustrated in FIG. 3, each of the end guides 64 includes a restriction part 641 and an opposed piece 642.

The restriction part 641 is arranged so as to be orthogonal to the support plate 67, and in the present embodiment, an end portion of the sheet P abuts against the restriction part 641 to restrict movement of the sheet P.

The opposed piece 642 is connected to the restriction part 641 and is arranged so as to be opposed to the support plate 67.

In the present embodiment, when the sheet P is placed on the support plate 67, the end portion of the sheet P enters between the opposed piece 642 and the support plate 67. Further, the end portion of the sheet P abuts against the restriction part 641. Accordingly, registration of the sheet P is performed.

At the execution of the binding processing at the position (A) illustrated in FIG. 3, the binding processing is performed through a gap formed between the opposed piece 642 indicated by a reference numeral 3E and positioned at the center in FIG. 3 (the center in an up-down direction) and the opposed piece 642 indicated by a reference numeral 3F and positioned at a lower part of the drawing.

Also at the supply of moisture or the removal of moisture at the position (A) illustrated in FIG. 3, the supply of moisture or the removal of moisture is performed through the gap formed between the opposed piece 642 indicated by the reference numeral 3E and positioned at the center in the drawing and the opposed piece 642 indicated by the reference numeral 3F and positioned at the lower part of the drawing.

At the execution of the binding processing at the position (B) illustrated in FIG. 3, the binding processing is performed through a gap formed between the opposed piece 642 indicated by a reference numeral 3G and positioned at the upper part of the drawing and the opposed piece 642 indicated by the reference numeral 3E and positioned at the center in the drawing.

At the supply of moisture or the removal of moisture at the position (B) illustrated in FIG. 3, the supply of moisture or the removal of moisture is performed through the gap formed between the opposed piece 642 indicated by the reference numeral 3G and positioned at the upper part of the drawing and the opposed piece 642 indicated by the reference numeral 3E and positioned at the center in the drawing.

In the present embodiment, although description will be made of a case where a binding processing unit that does not use a binding member such as a staple is used as the binding processing unit 52 as an example, a binding processing unit that uses a binding member such as a staple may be additionally provided.

In a case where the binding processing unit using the binding member is additionally provided, for example, the binding processing unit for use in binding is switched according to an instruction from a user.

In this case, both the binding processing without using the binding member and the binding processing using the binding member can be performed.

Figure 4:
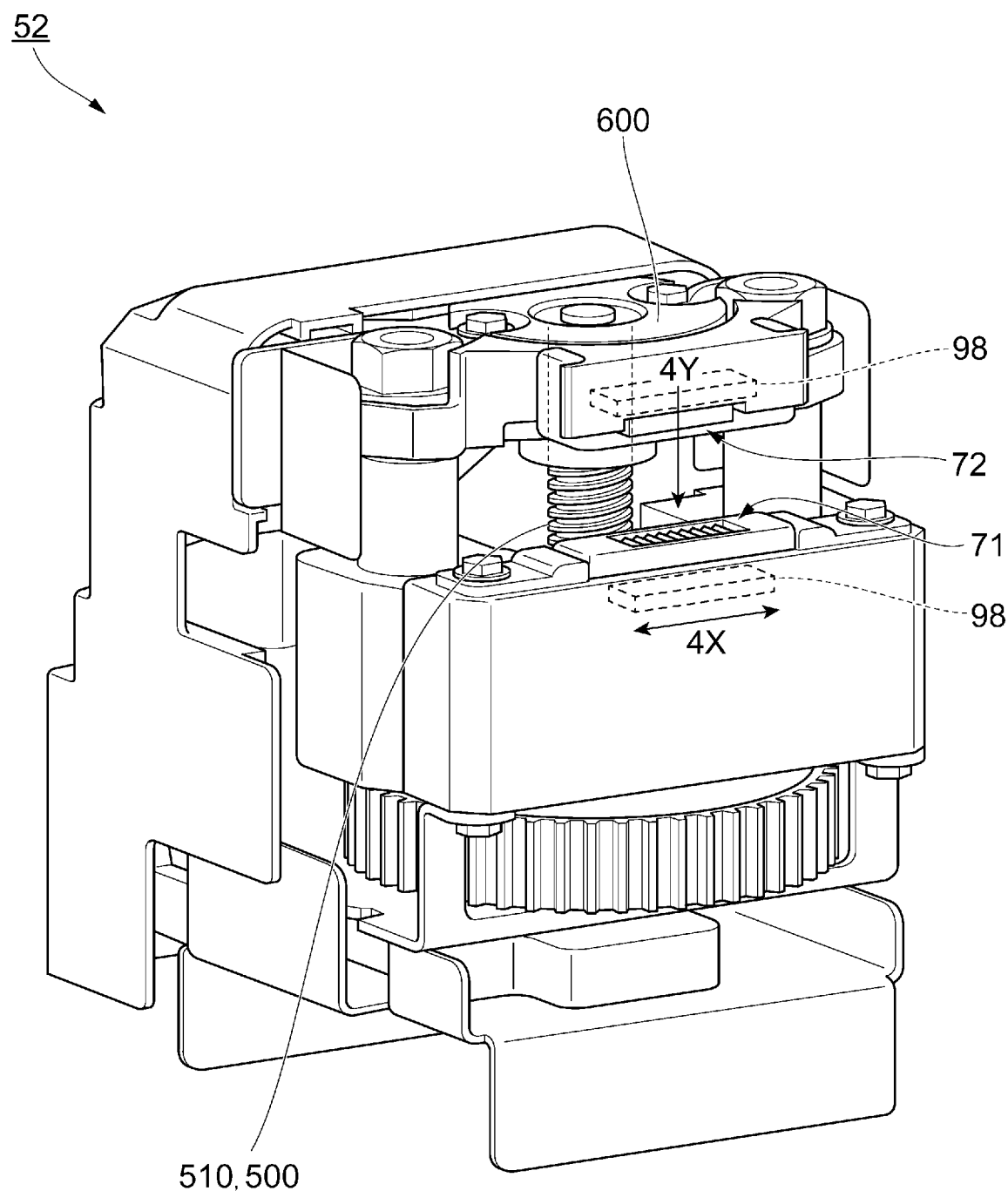
FIG. 4 is a view of a binding processing unit as seen from a direction indicated by an arrow IV in FIG. 3.

FIG. 4 is a view of the binding processing unit 52 as seen from a direction indicated by an arrow IV in FIG. 3.

The binding processing unit 52, which is an example of the binding processing element, is provided with a first binding tooth 71 that is used to bind a sheet bundle of the plurality of sheets P.

A second binding tooth 72 is provided above the first binding tooth 71.

Each of the first binding tooth 71 and the second binding tooth 72 has a rugged portion.

A surface of the first binding tooth 71 positioned on the side of the second binding tooth 72 and a surface of the second binding tooth 72 positioned on the side of the first binding tooth 71 are provided with rugged portions in which projections and depressions are alternately arranged in a direction indicated by an arrow 4X in the drawing.

In other words, the surface of the first binding tooth 71 positioned on the side of the second binding tooth 72 and the surface of the second binding tooth 72 positioned on the side of the first binding tooth 71 are provided with rugged portions in which projections and depressions are alternately arranged in a longitudinal direction of the first binding tooth 71 and the second binding tooth 72.

When the binding processing is performed by the first binding tooth 71 and the second binding tooth 72, the second binding tooth 72 advances toward the first binding tooth 71.

More specifically, in the present embodiment, when the binding processing is performed, the second binding tooth 72 moves downward along a linear path indicated by an arrow 4Y in the drawing toward the first binding tooth 71.

In the present embodiment, a sheet bundle (not shown) positioned between the first binding tooth 71 and the second binding tooth 72 is then sandwiched and pressed by the first binding tooth 71 and the second binding tooth 72.

At this time, in the present embodiment, the projections of the first binding tooth 71 and the depressions of the second binding tooth 72 are opposed to each other. At this time, the depression of the first binding tooth 71 and the projection of the second binding tooth 72 are opposed to each other.

Further, into the depression provided on one binding tooth, the projection provided on the other binding tooth is entered.

As a result, the sheets forming the sheet bundle are pressed against each other to perform the binding processing of the sheets P. Then, in the present embodiment, the second binding tooth 72 moves upward to retreat from the first binding tooth 71.

Although, in the present embodiment, the description has been made of the case where the projections and the depressions are alternately arranged in each of the first binding tooth 71 and the second binding tooth 72 as an example, the projections and the depressions may be arranged in another manner.

The binding processing unit 52 is provided with a moving mechanism 500 as an example of a moving element that moves the second binding tooth 72 toward the first binding tooth 71.

The moving mechanism 500 includes a rod-shaped screw member 510 extending in the up-down direction in the drawing, and rotates the screw member 510 in a circumferential direction to move the second binding tooth 72 toward the first binding tooth 71.

In the present embodiment, an interlocking part 600 that moves in conjunction with the second binding tooth 72 is provided. In the present embodiment, the screw member 510 is engaged with the interlocking part 600. In other words, the screw member 510 is connected to the interlocking part 600.

The moving mechanism 500 rotates the screw member 510 engaged with the interlocking part 600 in a circumferential direction to move the second binding tooth 72 toward the first binding tooth 71.

More specifically, in the present embodiment, when a driving motor (not illustrated) provided in the binding processing unit 52 is rotated forward, the screw member 510 is rotated in one circumferential direction.

The interlocking part 600 and the second binding tooth 72 are accordingly lowered, and the second binding tooth 72 moves to the first binding tooth 71. As a result, the binding processing is performed.

When the binding processing is completed, the driving motor reversely rotates and the screw member 510 rotates in a reverse direction.

As a result, the interlocking part 600 and the second binding tooth 72 are raised. When the second binding tooth 72 is raised, the second binding tooth 72 retreats from the first binding tooth 71.

Although the second binding tooth 72 is moved by using the screw member 510 in the present embodiment, a mechanism for moving the second binding tooth 72 is not particularly limited, and a cam mechanism, a jack mechanism, or the like may be alternatively used.

Although the second binding tooth 72 is moved in the present embodiment, the first binding tooth 71 may be moved or both the first binding tooth 71 and the second binding tooth 72 may be moved.

The present embodiment is configured to allow the binding processing unit 52 to pass through the end guide 64 illustrated in FIG. 3.

More specifically, in the present embodiment, a maximum distance between the first binding tooth 71 and the second binding tooth 72 is larger than a height of the end guide 64, so that the end guide 64 passes through the above-described reception part. As a result, the binding processing unit 52 passes through the end guide 64.

Figure 5:
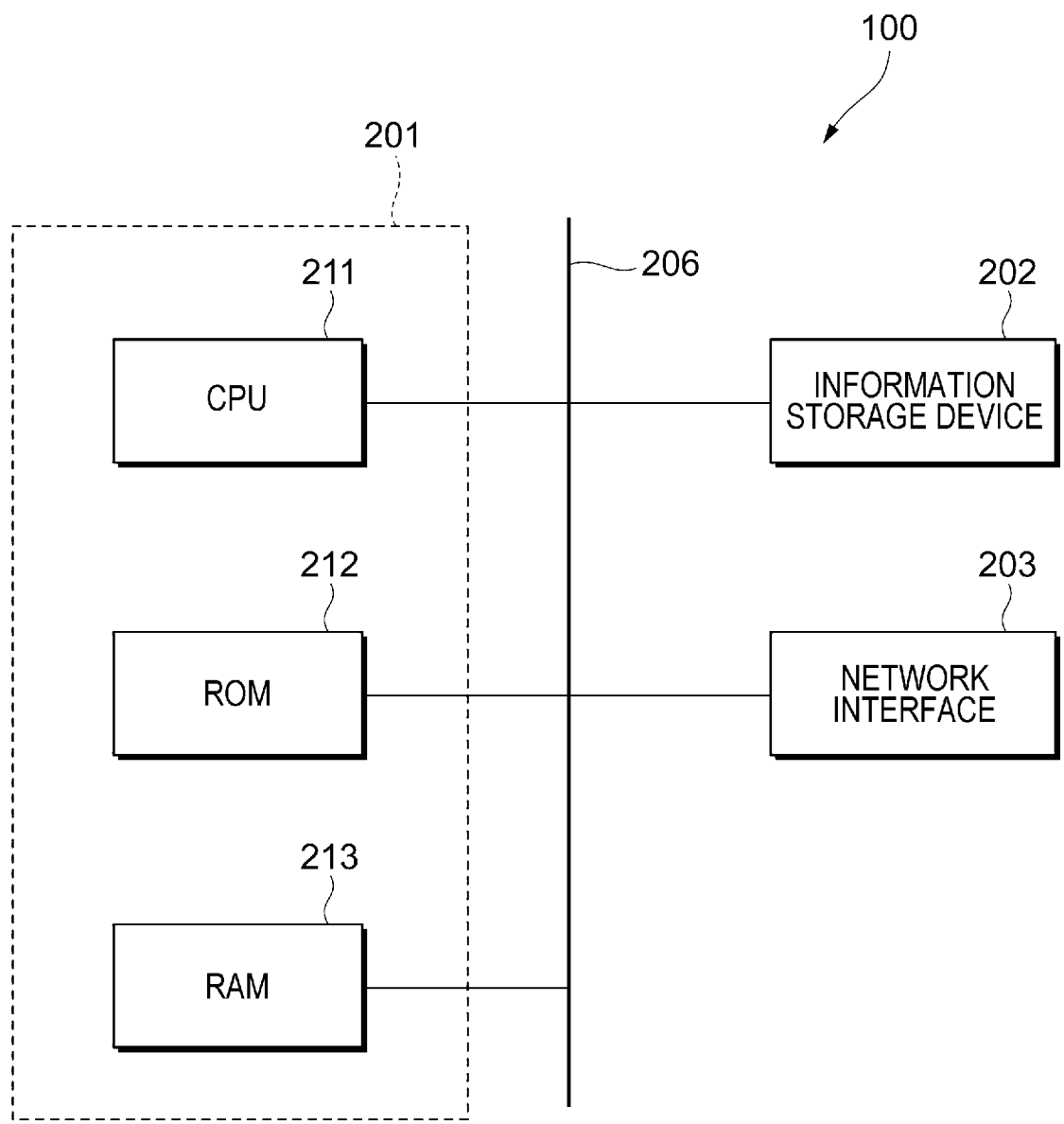
FIG. 5 is a diagram illustrating a hardware configuration of an information processing part.

FIG. 5 is a diagram illustrating a hardware configuration of the information processing part 100.

The information processing part 100 includes a processing unit 201, an information storage device 202 that stores information, and a network interface 203 that realizes communication via a local area network (LAN) cable or the like.

Further, the processing unit 201 is configured with a computer.

The processing unit 201 has a central processing unit (CPU) 211 as an example of a processor that executes various types of processing described below. In addition, the processing unit 201 has a read only memory (ROM) 212 that stores software and a random access memory (RAM) 213 that is used as a work area.

The information storage device 202 is realized by an existing device such as a hard disk drive, a semiconductor memory, or a magnetic tape.

The processing unit 201, the information storage device 202, and the network interface 203 are connected through a bus 206 or a signal line (not illustrated).

A program executed by the CPU 211 can be provided to the information processing part 100 in a state of being stored in a computer-readable recording medium such as a magnetic recording medium (a magnetic tape, a magnetic disk, or the like), an optical recording medium (an optical disc or the like), a magneto-optical recording medium, and a semiconductor memory. Alternatively, the program executed by the CPU 211 may be provided to the information processing part 100 using communication means such as the Internet.

In the present specification, the processor represents a processor in a broad sense, and includes a general-purpose processor (e.g., CPU: Central Processing Unit) and a dedicated processor (e.g., GPU: Graphics Processing Unit, ASIC: Application Specific Integrated Circuit, FPGA: Field Programmable Gate Array, programmable logic device, or the like).

Operation of the processor may be realized not only by one processor but also by cooperation of a plurality of processors present at physically separated positions. An order of the respective operations of the processor is not limited to the order described in the present embodiment, and may be changed.

[Specific Example of Processing] Processing executed by the information processing part 100 will be described below.

In the present embodiment, the CPU 211, which is an example of a processor, controls at least one of the binding processing unit 52 and the moisture regulating mechanism 700 so that a ratio of a volume of moisture contained in the bound part falls within a specific range.

More specifically, the CPU 211 controls at least one of the binding processing unit 52 and the moisture regulating mechanism 700 so that the ratio of the volume of the moisture contained in the bound part of the sheet P having been subjected to the binding processing to a volume of the bound part falls within the specific range.

As a result, the ratio of the volume of the moisture contained in the bound part having been subjected to the binding processing to the volume of the bound part falls within the specific range.

Figure 6:
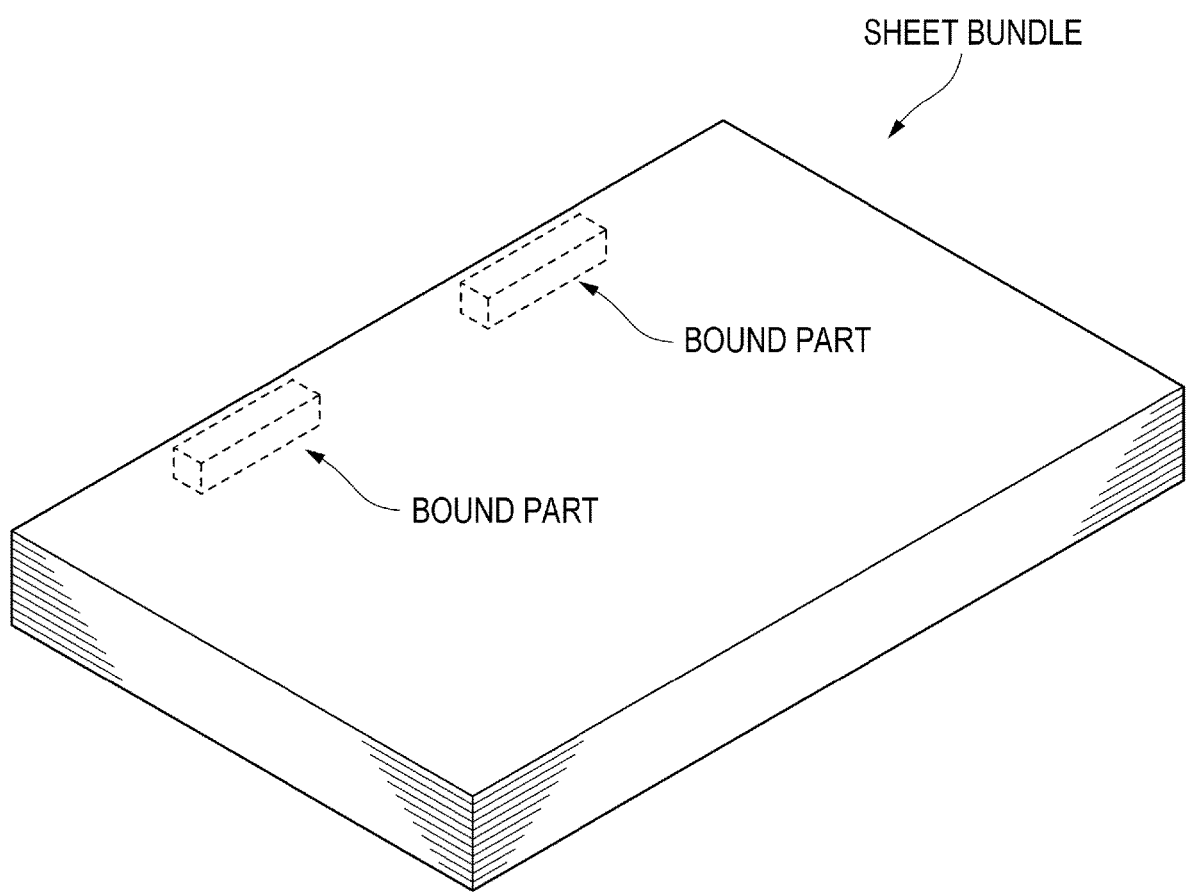
FIG. 6 is a view illustrating a sheet bundle after binding processing.

In the present specification, a "volume of a bound part of the sheet P having been subjected to the binding processing" represents a volume of a bound part of the sheet P after the binding processing as illustrated in FIG. 6 (the drawing illustrating the sheet bundle after the binding processing). In a case where there are a plurality of bound parts as illustrated in FIG. 6, a volume of a bound part represents a volume of each bound part.

The "volume of the bound part of the sheet P having been subjected to the binding processing" can be said to be a volume of a space between the second binding tooth 72 and the first binding tooth 71 when the second binding tooth 72 approaches most to the first binding tooth 71.

A "volume of moisture contained in a bound part" represents a volume of moisture contained in a bound part of the sheet P having been subjected to the binding processing. In a case where there are a plurality of bound parts, this volume is a volume of moisture contained in each of the bound parts.

The volume of the moisture can be acquired, for example, on the basis of a subtracted value that is a value obtained by subtracting an after drying weight, which is a weight of a bound part having been dried, from an immediately after weight, which is a weight of a bound part immediately after the binding processing is performed. More specifically, the volume can be obtained on the basis of a subtracted value that is a value obtained by subtracting an after drying weight, which is a weight of a bound part having been left "in an environment of a temperature of 105° C. for two hours", from an immediately after weight of the bound part.

More specifically, the volume of the moisture contained in the bound part can be obtained by dividing the subtracted value by, for example, "1" which is a specific gravity of water.

Alternatively, the volume of the moisture included in the bound part can be acquired in another manner on the basis of a total moisture weight that is a weight after adding a standard weight that is a weight of standard moisture (4% to 6%) to be included in the bound part under normal environment to a subtracted value that is a value obtained by subtracting, from the immediately after weight of the bound part, an after leaving weight that is a weight of the bound part after leaving the bound part at a "humidity of 50% RH and 21° C." as an example of the normal environment for 24 hours.

More specifically, the volume of the moisture contained in the bound part can be obtained by dividing the total moisture weight by, for example, "1" which is a specific gravity of water.

In general, paper is to contain about 4% to 6% of moisture at the humidity 50% RH and 21° C., which is an example of the normal environment. Therefore, as described above, the volume of the moisture contained in the bound part can be acquired on the basis of the total moisture weight obtained by acquiring a difference between the immediately after weight of the bound part and the after leaving weight which is the weight of the bound part after leaving the bound part under the normal environment and adding, to the difference, the above standard weight which is the weight (4% to 6%) of the moisture under the normal environment.

In the present embodiment, the CPU 211 controls at least one of the binding processing unit 52 and the moisture regulating mechanism 700 so that the above-described ratio falls within a range of 25% to 50%.

Accordingly, in the present embodiment, the ratio of the volume of the moisture contained in the bound part to the volume of the bound part falls within the range of 25% to 50%.

As a result, as compared with a case in which the ratio is lower than 25% or a case in which the ratio exceeds 50%, a binding force between the sheets forming the sheet bundle is increased to make the binding be less likely to be released.

Figure 7:
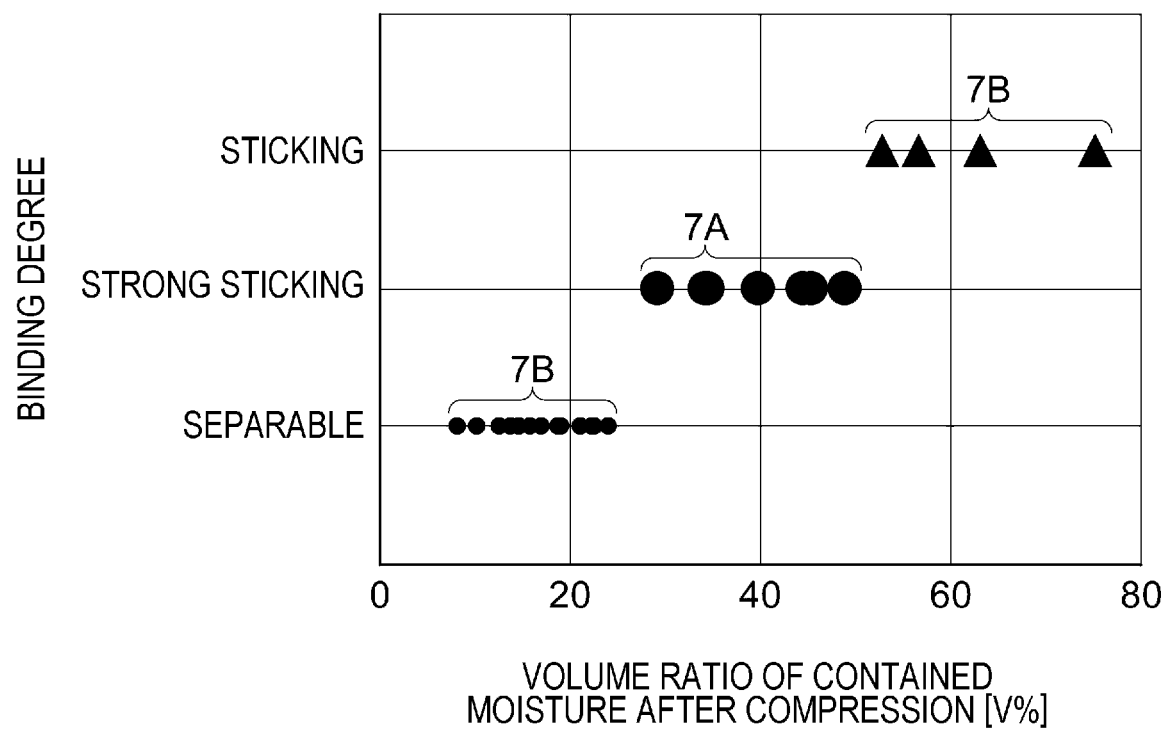
FIG. 7 is a diagram showing adhesion of a sheet.

Experiment conducted by the inventor confirmed that when the ratio is within the range of 25% to 50%, which is an example of a specific range, adhesion between the sheets forming the sheet bundle is increased to make the binding be less likely to be released, as indicated by a reference numeral 7A in FIG. 7 (the diagram showing the adhesion of the sheets P).

On the other hand, the experiment by the inventor confirmed that when the ratio is outside of 25% to 50%, which is the example of a specific range, binding strength decreases as compared with the case where the ratio is within 25% to 50%, as indicated by a reference numeral 7B in FIG. 7.

More specifically, when the ratio was within the range of 25% to 50%, which was the example of a specific range, even if an uppermost sheet P of the sheet bundle is manually pulled in a direction away from the sheet bundle, the binding was not easily released.

By contrast, in the case where the ratio was outside of 25% to 50%, which was the example of a specific range, when the uppermost sheet P is manually pulled away from the sheet bundle, the uppermost sheet P of the sheet bundle was easily released.

Although in general, as a degree of compression of the bound part increases, the binding force increases, the more the degree of compression increases, the more the amount of moisture occupying the bound part relatively increases. When the amount of moisture becomes too large, the binding strength conversely decreases.

Although in general, the lower the degree of compression of the bound part, the weaker the binding, even in this case, when the moisture contained in the bound part is increased, fibers forming the sheet P easily adhere to each other to increase the adhesion strength between the sheets.

Further, although in general when the amount of moisture contained in the bound part is increased, fibers forming the sheet P easily adhere to each other, when the amount of moisture is too large, conversely, the fibers hardly adhere to each other.

Further, although in general when the amount of moisture contained in the bound part is small, adhesion strength between fibers forming the sheet P tends to decrease, when the degree of compression of the bound part is increased, a relative amount of moisture increases to increase the binding strength.

In view of these backgrounds, a binding processing time condition, which is a condition for performing binding processing on a sheet bundle, is set as a condition for further increasing adhesion strength between sheets in the present embodiment.

In the present embodiment, when the binding processing time condition is not suitable for setting the ratio within the above-described specific range, the CPU 211 performs control such that the ratio falls within the above-described specific range.

In a case where the amount of moisture contained in the bound part of the sheet P is too large or too small, or where an amount of advancement of the second binding tooth 72 is too large or too small, the binding processing time condition is not suitable for keeping the above ratio within the above specific range.

In this case, the CPU 211 changes a set value that is set at that time, and sets the binding processing time condition to a condition in which the ratio falls within the specific range.

In other words, in a case where the binding processing time condition corresponds to a non-applicable condition that is a condition in which the ratio does not fall within the specific range, the CPU 211 changes the set value that has been set at that time.

In other words, in this case, the CPU 211 changes the setting made at that time to make the binding processing time condition that enables the ratio to fall within the specific range.

Then, on the basis of the changed setting, the CPU 211 controls the binding processing unit 52 and the moisture regulating mechanism 700. In other words, on the basis of the changed set value, the CPU 211 controls the binding processing unit 52 and the moisture regulating mechanism 700. Accordingly, the ratio falls within the specific range.

In this case, the CPU 211 controls at least one of the binding processing unit 52 and the moisture regulating mechanism 700 so that the ratio of the volume of the moisture contained in the bound part to the volume of the bound part falls within the specific range.

[In Case Where Binding Processing Time Condition is Condition Where Ratio Becomes Lower Than Lower Limit of Specific Range] For example, when the binding processing time condition is a condition in which the ratio becomes lower than a lower limit of the specific range, the CPU 211 executes setting such that moisture is supplied to the sheet P by the moisture regulating mechanism 700 or such that an amount of moisture supplied to the sheet P by the moisture regulating mechanism 700 is increased.

In a case where it is set at that time that the moisture regulating mechanism 700 does not supply moisture to the sheet P, when the binding processing time condition is the condition in which the ratio becomes lower than the lower limit of the specific range, the CPU 211 executes setting to supply moisture to the sheet P by the moisture regulating mechanism 700.

In the case where it is set at that time that the regulating mechanism 700 supplies the moisture to the sheets P, when the binding processing time condition is the condition in which the ratio becomes lower than the lower limit of the specific range, the CPU 211 executes setting to increase the amount of the moisture supplied to the sheet P by the moisture regulating mechanism 700.

The CPU 211 determines whether or not the binding processing time condition is the condition in which the ratio becomes lower than the lower limit of the specific range on the basis of, for example, an amount of advancement of the second binding tooth 72 and a moisture regulation amount that is an amount of moisture regulated by the moisture regulating mechanism 700, these amounts being set at that time.

Figure 8:
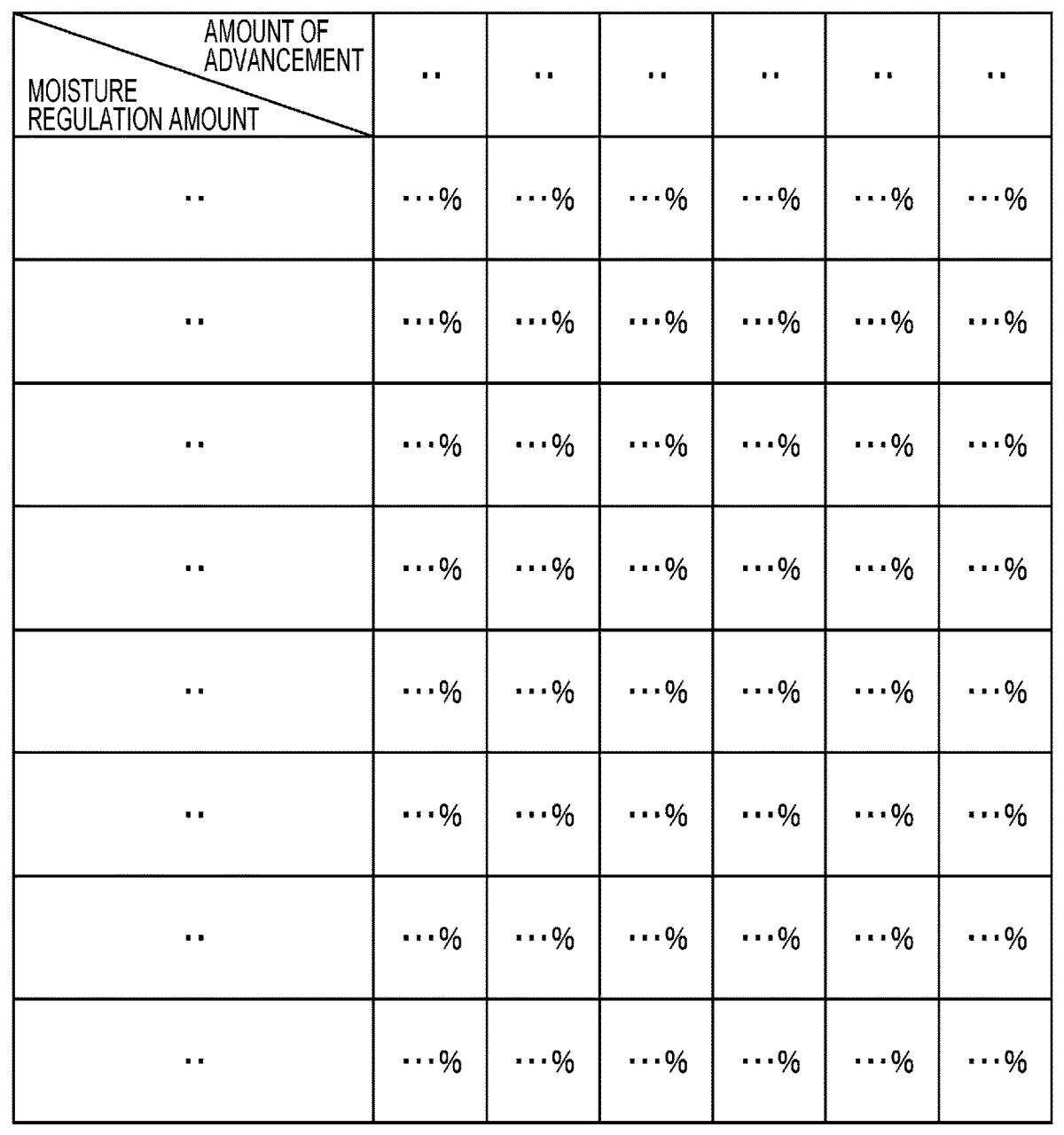

In the present embodiment, a relationship table (see FIG. 8) describing the relationship between the amount of advancement, the moisture regulation amount, and the above-described ratio is registered in the information storage device 202 (see FIG. 5), and the CPU 211 acquires a current ratio on the basis of currently set amount of advancement, moisture regulation amount, and the information registered in the relationship table, and then determines whether the acquired current ratio is within the specific range or not.

Then, under the condition in which the current ratio becomes lower than the lower limit of the specific range, the CPU 211 executes setting, for example, such that moisture is supplied to the bound part by the moisture regulating mechanism 700 or such that an amount of the moisture to be supplied to the bound part by the moisture regulating mechanism 700 is increased.

More particularly, in this case, the CPU 211 refers to the above relationship table again, and acquires such a new set value for the moisture regulating mechanism 700 that enables the ratio to fall within the specific range.

Then, the CPU 211 controls the moisture regulating mechanism 700 on the basis of the acquired set value. As a result, the moisture is supplied to the bound part or the amount of moisture supplied to the bound part is increased, so that the ratio falls within the specific range.

In addition, when the binding processing time condition is the condition in which the ratio becomes lower than the lower limit of the specific range, the CPU 211 alternatively executes setting to increase an amount of advancement of the second binding tooth 72 toward the sheet bundle.

Specifically, in setting the ratio, the CPU 211 first refers to the relationship table to determine whether the current ratio is within the specific range or not as described above.

When the current ratio is lower than the lower limit of the specific range, the CPU 211 executes setting such that the amount of advancement of the second binding tooth 72 toward the sheet bundle is increased.

Specifically, the CPU 211 refers to the above relationship table, and obtains such a new set value of the amount of advancement that enables the ratio to fall within the specific range.

Then, the CPU 211 controls the binding processing unit 52 on the basis of the acquired set value. As a result, the amount of advancement of the second binding tooth 72 is increased, so that the ratio falls within the specific range.

In the description above, While in the case where the binding processing time condition is the condition in which the ratio becomes lower than the lower limit of the specific range, any one of new setting for the supply of moisture and new setting for the amount of advancement is performed.

Not limited thereto, both the new setting for the supply of the moisture and the new setting for the amount of advancement may be performed such that the ratio falls within the specific range.

In other words, while setting may be executed such that the moisture is supplied to the sheet P or the amount of moisture supplied to the sheet P is increased, setting may be executed such that the amount of advancement is increased, thereby enabling the ratio to fall within the specific range.

[In Case Where Binding Processing Time Condition is Condition in Which Ratio Becomes Higher Than Upper Limit of Specific Range] In a case where the binding processing time condition is a condition in which the ratio becomes higher than an upper limit of the specific range, i.e., in a case where the binding processing time condition is a condition in which the amount of the moisture becomes relatively large with respect to the volume of the bound part, the CPU 211 executes setting, for example, such that the bound part is dried by the moisture regulating mechanism 700 or such that a degree of drying of the bound part by the moisture regulating mechanism 700 becomes high.

In other words, in this case, the CPU 211 executes setting such that the bound part is heated by the moisture regulating mechanism 700 or such that the degree of heating of the bound part by the moisture regulating mechanism 700 is increased.

More particularly, also in this case, as described above, the CPU 211 refers to the relationship table and acquires such a new set value for the moisture regulating mechanism 700 that enables the ratio to fall within the specific range.

Further, in the case where the binding processing time condition is the condition in which the ratio becomes higher than the upper limit of the specific range, the CPU 211 alternatively executes setting such that no moisture is supplied to the bound part by the moisture regulating mechanism 700 or such that a degree of moisture supply to the bound part by the moisture regulating mechanism 700 is reduced.

More particularly, also in this case, as described above, the CPU 211 refers to the relationship table and acquires such a new set value for the moisture regulating mechanism 700 that enables the ratio to fall within the specific range.

In addition, alternatively, in the case where the binding processing time condition is the condition in which the ratio becomes higher than the upper limit of the specific range, for example, the CPU 211 executes setting such that the amount of advancement of the second binding tooth 72 toward the sheet bundle by the binding processing unit 52 is reduced.

More specifically, also in this case, as described above, the CPU 211 refers to the relationship table and acquires such a new set value for the binding processing unit 52 that enables the ratio to fall within the specific range.

As described above, under the condition where the ratio becomes higher than the upper limit of the specific range, both the new setting for the supply of the moisture and the new setting for the amount of advancement may be performed such that the ratio falls within the specific range.

Specifically, for example, while setting may be executed such that the sheet bundle is dried or the degree of the drying is increased, setting may be executed such that the amount of advancement is reduced, thereby causing the ratio to fall within the specific range.

In addition, for example, while setting may be executed such that no moisture is supplied to the sheet bundle or the amount of moisture supplied to the sheet bundle is reduced, setting may be executed such that the amount of advancement is reduced, thereby causing the ratio to fall within the specific range.

[Processing When Setting is Changed] In the present embodiment, when the setting of one of the binding processing unit 52 and the moisture regulating mechanism 700 is changed, the CPU 211 executes setting of the other such that the above ratio falls within the above specific range.

For example, in a case where the user executes setting to reduce the amount of advancement of the second binding tooth 72, so that the ratio becomes lower than the lower limit of the specific range, the CPU 211 performs control such that the moisture supply by the moisture regulating mechanism 700 is performed or such that moisture supplied to the sheet P by the moisture regulating mechanism 700 is increased.

Specifically in this case, as described above, the CPU 211 refers to the relationship table to execute new setting for the moisture regulating mechanism 700. As a result, also in this case, the ratio falls within the specific range.

Further, in a case, for example, where the user executes setting such that the amount of advancement of the second binding tooth 72 increases, so that the ratio exceeds the upper limit of the specific range, the CPU 211 refers to the relationship table to execute new setting for the moisture regulating mechanism 700. As a result, also in this case, the ratio falls within the specific range.

Specifically, in a case where the user executes setting such that the amount of advancement of the second binding tooth 72 increases, so that the ratio exceeds the upper limit of the specific range, the CPU 211 performs control such that the sheet P is dried by the moisture regulating mechanism 700 or such that the degree of drying of the sheet P by the moisture regulating mechanism 700 is increased. As a result, the ratio falls within the specific range.

In addition, in a case where the user executes setting such that the amount of advancement of the second binding tooth 72 increases, so that the ratio exceeds the upper limit of the specific range, the CPU 211 alternatively performs control, for example, such that the amount of the moisture supplied to the sheet P by the moisture regulating mechanism 700 is reduced or such that no moisture is supplied to the sheet P by the moisture regulating mechanism 700. Also in this case, the ratio falls within the specific range.

Further, for example, in a case where the user executes setting such that the moisture supply is performed by the moisture regulating mechanism 700 or such that the amount of the moisture supplied by the moisture regulating mechanism 700 is increased, so that the ratio exceeds the upper limit of the specific range, the CPU 211 performs control to reduce the amount of advancement of the second binding tooth 72.

In other words, in this case, the CPU 211 refers to the relationship table to execute new setting for the binding processing unit 52, as described above. As a result, also in this case, the ratio falls within the specific range.

Further, for example, in a case where the user executes setting not to perform the supply of the moisture by the moisture regulating mechanism 700 or the user executes setting to reduce the amount of the moisture supplied by the moisture regulating mechanism 700, so that the ratio becomes lower than the lower limit of the specific range, the CPU 211 performs control to increase the amount of advancement of the second binding tooth 72.

In other words, also in this case, the CPU 211 refers to the relationship table to execute new setting for the binding processing unit 52, as described above. As a result, also in this case, the ratio falls within the specific range.

In the present embodiment, on the basis of the setting of one of the binding processing unit 52 and the moisture regulating mechanism 700, the CPU 211 executes setting for the other in this manner.

Although in the foregoing, the setting of the other is executed with reference to the relationship table, a threshold for each of the amount of advancement and the amount of moisture may be set, and in a case where a value for one setting exceeds the threshold, the setting for the other may be executed.

In other words, when the value for one setting exceeds the threshold, the set value for the other setting may be changed.

Specifically in this case, for example, when new setting for the amount of advancement corresponds to setting by which the amount of advancement exceeds the predetermined threshold, the CPU 211 executes setting for the moisture regulating mechanism 700 such that the moisture contained in the sheet bundle is reduced.

When the new setting for the amount of advancement is setting by which the amount of advancement becomes smaller than the predetermined threshold, the CPU 211 executes setting for the moisture regulating mechanism 700 such that the moisture contained in the sheet bundle is increased.

In addition, alternatively, when new setting for the amount of the moisture corresponds to setting by which the amount of the moisture exceeds the predetermined threshold, the CPU 211 executes setting for the binding processing unit 52 such that the amount of advancement of the second binding tooth 72 is reduced.

In addition, for example, when the new setting for the amount of the moisture corresponds to setting by which the amount of the moisture becomes smaller than the predetermined threshold, the CPU 211 executes setting for the binding processing unit 52 such that the amount of advancement of the second binding tooth 72 is increased.

When on the basis of the setting of one of the binding processing unit 52 and the moisture regulating mechanism 700, setting for the other is executed as described above, it is most preferable to execute setting for the other such that the ratio falls within the specific range similarly to the above.

However, the present invention is not limited thereto, and the setting of the other may be setting to make the ratio not fall within the specific range but approach to be within the specific range.

Also in this case, the binding strength of the sheets P is increased as compared with a case where the ratio does not approach the specific range at all.

While the case where new setting is performed by the user has been described above as an example, a case is also assumed where the device automatically performs the above-described new setting for one of the unit and the mechanism, and even in this case, the CPU 211 executes setting for the other on the basis of new setting for the one of the unit and the mechanism in the present embodiment.

Accordingly, in this case, the ratio falls within the specific range or the ratio approaches the specific range.

[Control to Set Ratio to be Outside Specific Range] Alternatively, the CPU 211 may switch control between control for setting the ratio within the specific range and control for setting the ratio outside the specific range according to an instruction from the user.

In other words, the CPU 211 may perform control such that the ratio falls outside the specific range upon reception of an instruction from the user.

When the ratio is controlled to be outside the specific range, the adhesion between the sheets included in the sheet bundle decreases. This facilitates separation of the sheet P from the sheet bundle.

Some user desires a state in which the sheet P is easily separated from the sheet bundle for reuse of the sheet P or the like, and such a user's request is satisfied by a configuration enabling control to bring the ratio to be outside the specific range.

[Drying after Binding Processing] The above description has been made of the case where the moisture is removed from the sheet P to dry the sheet P before the binding processing of the sheet P is performed. The present invention is not limited thereto, and the sheet P may be dried after the binding processing of the sheet P is performed.

Specifically, in this case, the CPU 211 performs control such that a bound part of the sheet P is dried after the binding processing of the sheet P.

The drying of the bound part that is performed after the binding processing may be realized not only by heating of the bound part after the binding processing but also by heating of the bound part with residual heat that is generated by heating of the bound part before the binding processing.

Further, even in a case of heating a bound part after the binding processing, heating of the bound part before the binding processing is not excluded, and the heating may be performed before the binding processing and then, the heating may be further performed after the binding processing.

As described above, when the amount of moisture contained in the bound part of the sheet P is large, adhesion strength between the sheets P decreases. For example, when a user turns over a page, such a failure as release of binding might occur.

More specifically, for example, when the above-described ratio is higher than the upper limit value of the specific range after the binding processing, the adhesion strength between the sheets decreases, and for example, when the user turns over a page, such a failure as release of binding might occur.

By contrast, when the bound part is heated, and then dried after the binding processing as in the present embodiment, the moisture in the bound part is reduced to increase the adhesion strength between the sheets.

In other words, in a case where the bound part is heated, and then dried after the binding processing, the ratio falls within the specific range or approaches the specific range, so that the adhesion strength between the sheets increases.

In order to dry the bound part after the binding processing, the CPU 211, for example, performs control to dry the bound part such that the moisture contained in the bound part falls within the specific range.

More specifically, similarly to the above, the CPU 211 performs control to dry the bound part so that the ratio of the volume of the moisture contained in the bound part of the sheet P to the volume of the bound part having been subjected to the binding processing falls within the specific range.

In the above description, before the binding processing is performed, the binding processing time condition is changed so that the ratio falls within the specific range. The invention is not however limited thereto, and the drying may be performed after the binding processing so that the ratio falls within the specific range.

In order to dry the bound part having been subjected to the binding processing, for example, first, moisture is supplied to the bound part by using the moisture regulating mechanism 700 before the binding processing by the binding processing unit 52 is performed.

Then, the CPU 211 performs control so that the bound part is heated after the binding processing, and the bound part is dried after the binding processing.

Specifically, in this case, after the binding processing of the sheets P by the binding processing unit 52 is performed, for example, the CPU 211 causes the moisture removing part 720 provided in the moisture regulating mechanism 700 to operate to heat the bound part. As a result, the bound part is dried.

More specifically, the CPU 211, for example, causes warm air to be applied to the bound part or causes the object to be heated which has been heated by the heat source to come into contact with the bound part, thereby heating the bound part. As a result, the moisture included in the bound part to which the moisture has been supplied is reduced.

Here, although the case where the bound part is dried after the supply of moisture has been described as an example, the supply of moisture is not essential, and the bound part may be dried in a state where no moisture is supplied.

Under certain conditions, such as when the sheet P is recycled paper or when the binding processing is performed in a high-humidity environment, a large amount of moisture might be contained in the bound part even without supplying moisture.

In this case, by drying the bound part, the ratio falls within the specific range or the ratio approaches the specific range as described above.

Alternatively, for example, processing may be performed in which a little more moisture than usual is supplied to the bound part before the binding processing, and the moisture is reduced by drying after the binding processing.

Specifically, in this case, for example, the moisture regulating mechanism 700 supplies moisture to the bound part before the binding processing is performed so that the moisture contained in the bound part exceeds the predetermined threshold.

Thereafter, the CPU 211 performs control to dry the bound part so that the moisture contained in the bound part becomes less than the predetermined threshold.

More specifically, in this case, for example, before the binding processing, the moisture is supplied such that the ratio exceeds the upper limit of the specific range.

Further, in this case, the control is performed such that the drying of the bound part is performed after the binding processing, thereby bringing the ratio exceeding the upper limit of the specific range to be within the specific range.

Alternatively, a configuration is also assumed in which the sheet P is heated before the binding processing of the sheet P is performed.

In this case, the CPU 211 may perform control to cause the temperature of the heating to be increased which is performed before the binding processing of the sheets P, and to dry the bound portion having been subjected to the binding processing.

Specifically, in the present embodiment, the fixing device 14 is provided in the image forming device 2 (see FIG. 1), and the sheet P is heated before the binding processing of the sheet P, so that the image on the sheet P is fixed to the sheet P.

For example, the CPU 211 may cause the temperature during heating of the sheet P by the fixing device 14 to be increased so that the bound part having been subjected to the binding processing is dried.

In this case, as compared with a case in which the temperature during heating of the sheet P by the fixing device 14 is not increased, the temperature of the bound part having been subjected to the binding processing is increased to promote drying of the bound part.

For example, as illustrated in FIG. 4, with a heating source 98 provided that heats the first binding tooth 71 and the second binding tooth 72, the bound part may be heated by execution of the binding processing using the first binding tooth 71 and the second binding tooth 72 in a heated state.

Specifically, in this case, the CPU 211 causes the heating source 98 to heat the first binding tooth 71 and the second binding tooth 72 when a predetermined condition is satisfied, for example, when moisture is supplied to the bound part or when the ratio exceeds the upper limit of the specific range.

As a result, also in this case, the bound portion is dried after the binding processing is performed.

Although the description has been made of the case in which both the first binding tooth 71 and the second binding tooth 72 are heated, only one of the first binding tooth 71 and the second binding tooth 72 may be heated.

Alternatively, by the control of preventing the user from touching the sheet P until a predetermined time elapses after the binding processing of the sheet P is performed, the CPU 211 may enable the bound part to be naturally dried.

More specifically, in this case, for example, the CPU 211 performs processing to notify the user via the information display unit 915 (see FIG. 1) so that the user does not touch the sheet P until the predetermined time elapses.

More specifically, for example, the CPU 211 causes information displays information such as "do not touch the sheet P until five minutes elapses" to be displayed on the information display unit 915.

As a result, the bound part is dried with a small load acting on the bound part.

Alternatively, a stop part at which the sheet P having been subjected to the binding processing is stopped may be provided in the first post-processing device 40 (see FIG. 1), for example.

In this case, the CPU 211 causes the stop part to stop the bound sheet P having been subjected to the binding processing until a predetermined time elapses, thereby enabling the bound sheet P to be naturally dried.

Also in this case, after the predetermined time has elapsed, the CPU 211 causes the sheet P located at the stop part to be ejected to the first loading part 43 located outside the first post-processing device 40.

What is claimed is:

1. A binding processing device comprising:
    a binding processing element that advances a binding tooth to a sheet to perform binding processing of the sheet; and
    a processor that performs control of drying a bound part of the sheet such that moisture contained in the bound part falls within a specific range after the binding processing of the sheet by the binding processing element is performed.

2. The binding processing device according to claim 1, further comprising:
    a moisture supply element that supplies moisture to the bound part before the binding processing by the binding processing element is performed,
    wherein
    the processor performs control of the drying the bound part by heating the bound part after the binding processing of the sheet by the binding processing element is performed.

3. The binding processing device according to claim 1, further comprising
    a moisture supply element that supplies moisture to the bound part before the binding processing by the binding processing element is performed,
    wherein
    the processor performs the control of drying the bound part so as to reduce moisture contained in the bound part to which the moisture is supplied.

4. The binding processing device according to claim 3, wherein
    the moisture supply element supplies moisture such that the moisture contained in the bound part exceeds a predetermined threshold, and
    the processor performs the control of drying the bound part so as to make the moisture contained in the bound part be less than the predetermined threshold.

5. The binding processing device according to claim 1, wherein
    before the binding processing of the sheet by the binding processing element is performed, the sheet is heated, and
    wherein
    the processor causes an increase in a temperature of the heating performed before the binding processing of the sheet by the binding processing element is performed so as to dry the bound part.

6. The binding processing device according to claim 5, wherein
    the processor causes a temperature of heating of a sheet performed by a fixing device to be increased so as to dry the bound part, the fixing device heating a sheet to fix an image of the sheet on the sheet before the binding processing of the sheet by the binding processing element is performed.

7. The binding processing device according to claim 1, further comprising
    a heating source that heats the binding tooth,
    wherein
    the processor performs control of the drying the bound part by causing the binding tooth to be heated by the heating source such that the bound part is dried by heat from the binding tooth after the binding processing element has performed the binding processing.

8. The binding processing device according to claim 1, wherein
    the processor performs control of preventing a user from touching a sheet until a predetermined time elapses after the binding processing of the sheet by the binding processing element is performed, so as to enable the bound portion to be naturally dried.

9. The binding processing device according to claim 8, wherein
    the processor performs notification processing to the user so as to prevent the user from touching the sheet until the predetermined time elapses.

10. The binding processing device according to claim 1, wherein
    the processor performs control of the drying the bound part by causing the bound part to be heated after the binding processing of the sheet by the binding processing element is performed.

11. The binding processing device according to claim 1, wherein
    the processor performs control of the drying the bound part by causing warm air to be applied to the bound part or causing an object to be heated that has been heated by a heat source to come into contact with the bound part.

12. The binding processing device according to claim 11, wherein
    after the binding processing of the sheet by the binding processing element is performed, the processor causes warm air to be applied to the bound part or causes the object to be heated that has been heated by the heat source to come into contact with the bound part.

13. An image forming system comprising:
    an image forming device that forms an image on a sheet; and
    a binding processing device that binds a sheet on which an image is formed by the image forming device, wherein
the binding processing device includes the binding processing device according to claim 1.

14. A non-transitory computer-readable recording medium recording a program for causing a computer to realize a function, the computer controlling a binding processing device including a binding processing element that advances a binding tooth to a sheet to perform binding processing of the sheet, wherein
the function is to perform control of drying a bound part to be dried such that moisture contained in the bound part falls within a specific range after the binding processing of the sheet by the binding processing element is performed.

\* \* \* \* \*